United States Patent
Harris et al.

(10) Patent No.: US 11,556,734 B2
(45) Date of Patent: *Jan. 17, 2023

(54) SYSTEM AND METHOD FOR UNSUPERVISED ABSTRACTION OF SENSITIVE DATA FOR REALISTIC MODELING

(71) Applicant: International Business Machines Corporation, Armonk, NY (US)

(72) Inventors: Brandon Harris, Union City, NJ (US); Eugene I. Kelton, Mechanicsburg, PA (US); Chaz Vollmer, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 628 days.

This patent is subject to a terminal disclaimer.

(21) Appl. No.: 16/674,462

(22) Filed: Nov. 5, 2019

(65) Prior Publication Data

US 2021/0133489 A1 May 6, 2021

(51) Int. Cl.
*G06Q 30/02* (2012.01)
*G06K 9/62* (2022.01)
*G06N 3/08* (2006.01)

(52) U.S. Cl.
CPC ......... *G06K 9/6222* (2013.01); *G06K 9/6228* (2013.01); *G06N 3/088* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| | | |
|---|---|---|
| 5,949,045 A | 9/1999 | Ezawa et al. |
| 6,741,973 B1 | 5/2004 | Dove et al. |
| (Continued) | | |

FOREIGN PATENT DOCUMENTS

| | | |
|---|---|---|
| CN | 101075330 A | 11/2007 |
| CN | 103236959 A | 8/2013 |
| (Continued) | | |

OTHER PUBLICATIONS

Maryani, I. and Riana, D., Aug. 2017. Clustering and profiling of customers using RFM for customer relationship management recommendations. In 2017 5th International Conference on Cyber and IT Service Management (CITSM) (pp. 1-6). IEEE (Year: 2017).*

(Continued)

*Primary Examiner* — Patricia H Munson
*Assistant Examiner* — Marjorie Pujols-Cruz
(74) *Attorney, Agent, or Firm* — Troutman Pepper Hamilton Sanders LLP

(57) ABSTRACT

An abstraction system for generating a standard customer profile in a data processing system has a processing device and a memory. The abstraction system may receive customer data from a computing device over a network, perform unsupervised learning on the customer data to produce a plurality of clusters of customers with a plurality of features in common, and determine that a cluster represents a standard customer, and store a plurality of standard customer profiles based on the determined standard customers, wherein the standard customer profiles comprise a plurality of data distributions for the plurality of features in common. The abstraction system also derives additional standard customer profiles by applying a boundary limiter to the customer data. The abstraction system additionally provides the standard customer profiles and the additional standard (Continued)

customer profiles to a cognitive system for generating synthetic transaction data.

21 Claims, 9 Drawing Sheets

(56) References Cited

U.S. PATENT DOCUMENTS

| | | | |
|---|---|---|---|
| 6,839,682 | B1 | 1/2005 | Blume et al. |
| 7,165,037 | B2 | 1/2007 | Lazarus et al. |
| 8,090,648 | B2 | 1/2012 | Zoldi et al. |
| 8,108,245 | B1 | 1/2012 | Hosea et al. |
| 8,140,502 | B2 | 3/2012 | Francis et al. |
| 8,504,408 | B2 | 8/2013 | Banthia et al. |
| 9,129,290 | B2 | 9/2015 | Kannan et al. |
| 9,710,365 | B2 | 7/2017 | Correll |
| 9,934,288 | B2 | 4/2018 | Aggarwal |
| 10,469,315 | B2 | 11/2019 | Nair et al. |
| 10,482,466 | B1* | 11/2019 | Walters .................. G06N 3/08 |
| 10,489,864 | B1 | 11/2019 | Werr |
| 10,521,856 | B1* | 12/2019 | Joseph .................. G06Q 40/00 |
| 10,686,811 | B1 | 6/2020 | Ehle |
| 10,832,249 | B1 | 11/2020 | Flowers et al. |
| 10,949,825 | B1 | 3/2021 | Brosamer et al. |
| 2002/0133721 | A1 | 9/2002 | Adjaoute |
| 2005/0278220 | A1 | 12/2005 | Hahn-Carlson et al. |
| 2007/0106582 | A1 | 5/2007 | Baker et al. |
| 2008/0313017 | A1 | 12/2008 | Totten |
| 2009/0183143 | A1 | 7/2009 | Li et al. |
| 2009/0210368 | A1 | 8/2009 | Deo et al. |
| 2010/0153184 | A1 | 6/2010 | Caffrey et al. |
| 2012/0284080 | A1 | 11/2012 | De Oliveira et al. |
| 2013/0139003 | A1 | 5/2013 | Patwardhan et al. |
| 2013/0191531 | A1 | 7/2013 | Kruglick |
| 2013/0282542 | A1 | 10/2013 | White |
| 2014/0058763 | A1 | 2/2014 | Zizzamia et al. |
| 2014/0074614 | A1 | 3/2014 | Mehanian et al. |
| 2014/0222506 | A1 | 8/2014 | Frazer et al. |
| 2014/0314225 | A1 | 10/2014 | Riahi et al. |
| 2015/0039435 | A1 | 2/2015 | Shahee |
| 2015/0127455 | A1 | 5/2015 | Penzotti et al. |
| 2015/0178825 | A1 | 6/2015 | Huerta et al. |
| 2016/0155136 | A1 | 6/2016 | Zhang et al. |
| 2016/0162917 | A1 | 6/2016 | Singh et al. |
| 2016/0170778 | A1 | 6/2016 | Kalyanpur |
| 2016/0239857 | A1 | 8/2016 | Milton et al. |
| 2016/0267483 | A1 | 9/2016 | Jenson |
| 2017/0124487 | A1 | 5/2017 | Szeto et al. |
| 2017/0148042 | A1 | 5/2017 | Sullivan et al. |
| 2017/0236131 | A1 | 8/2017 | Nathenson et al. |
| 2017/0249661 | A1 | 8/2017 | Alzate Perez et al. |
| 2018/0081787 | A1 | 3/2018 | Riddick et al. |
| 2018/0089442 | A1* | 3/2018 | Kenthapadi ......... G06F 21/6245 |
| 2018/0232657 | A1 | 8/2018 | Acharya et al. |
| 2018/0240036 | A1 | 8/2018 | Boada et al. |
| 2018/0293498 | A1 | 10/2018 | Campos et al. |
| 2018/0365674 | A1 | 12/2018 | Han et al. |
| 2019/0057400 | A1 | 2/2019 | Nair et al. |
| 2019/0073669 | A1 | 3/2019 | Dutta et al. |
| 2019/0095924 | A1 | 3/2019 | Adjaoute |
| 2019/0279218 | A1 | 9/2019 | Adjaoute |
| 2019/0295001 | A1 | 9/2019 | Fusco et al. |
| 2019/0370812 | A1 | 12/2019 | Kandasamy et al. |
| 2019/0377902 | A1 | 12/2019 | Schroeder et al. |
| 2020/0019864 | A1 | 1/2020 | Gu et al. |
| 2020/0027045 | A1 | 1/2020 | Saarenvirta |
| 2020/0092172 | A1 | 3/2020 | Kumaran et al. |
| 2020/0167686 | A1 | 5/2020 | Mallya Kasaragod et al. |
| 2020/0175759 | A1 | 6/2020 | Russell et al. |
| 2020/0242669 | A1 | 7/2020 | Carroll et al. |
| 2020/0273052 | A1 | 8/2020 | Ganti et al. |
| 2020/0329066 | A1 | 10/2020 | Kirti et al. |
| 2020/0387752 | A1 | 12/2020 | Kursun |
| 2021/0049456 | A1 | 2/2021 | Kursun |
| 2021/0133490 | A1 | 5/2021 | Harris et al. |
| 2021/0264448 | A1 | 8/2021 | Harris et al. |

FOREIGN PATENT DOCUMENTS

| | | |
|---|---|---|
| CN | 109614301 A | 4/2019 |
| CN | 110008696 A | 7/2019 |
| CN | 110009171 A | 7/2019 |
| WO | 9901833 A1 | 1/1999 |
| WO | 2007143059 A2 | 12/2007 |
| WO | 2007147166 A1 | 12/2007 |
| WO | 2018194707 A1 | 10/2018 |

OTHER PUBLICATIONS

Barse, E.L., Kvarnstrom, H. and Jonsson, E., Dec. 2003. Synthesizing test data for fraud detection systems. In 19th Annual Computer Security Applications Conference, 2003. Proceedings, (pp. 384-394). IEEE (Year: 2003).*

Amarasinghe, "Critical analysis of machine learning based approaches for fraud detection in financial transactions," 2018, In Proceedings of the 2018 International Conference on Machine Learning Technologies, pp. 12-17 (Year: 2018).

Venkataram et al., "An authentication scheme for ubiquitous commerce: A cognitive agents based approach," IEEE 978-1-4244-2067-4/08, 2008 (Year: 2008).

Rieke et al., "Fraud Detection in Mobile Payments Utilizing Process Behavior Analysis," 2013 International Conference an Availability, Reliability and Security, 2013 (Year: 2013).

International Search Report and Written Opinion dated Feb. 19, 2021 in related International Patent Application Serial No. PCT/IB2020/060268.

International Search Report and Written Opinion dated Feb. 19, 2021 in related International Patent Application Serial No. PCT/IB2020/060267.

Non-Final Office Action dated Apr. 13, 2021 in related U.S. Appl. No. 16/674,457.

Non-Final Office Action dated Apr. 28, 2021 in related U.S. Appl. No. 16/674,451.

Non-Final Office Action dated Apr. 28, 2021 in related U.S. Appl. No. 16/674,452.

Bruwer, "Domain-specific market segmentation using a latent class mixture modelling approach and wine-related lifestyle (WRL) algorithm," 2017, European Journal of Marketing, vol. 51, No. 9/10, pp. 1552-1576—directed to disclosing use of unsupservised learning algorithsm to find clusters or segments of marketing data in PCA (principal components analysis) and LCA (latent class analysis) (See p. 1556).

U.S. Appl. No. 16/674,451, filed Nov. 5, 2019, 20210133586.
U.S. Appl. No. 16/674,452, filed Nov. 5, 2019, 20210133488.
U.S. Appl. No. 16/674,454, filed Nov. 5, 2019, 20210133783.
U.S. Appl. No. 16/674,456, filed Nov. 5, 2019, 20210133864.
U.S. Appl. No. 16/674,457, filed Nov. 5, 2019, 20210133892.
U.S. Appl. No. 16/674,459, filed Nov. 5, 2019, 20210133771.
U.S. Appl. No. 16/674,464, filed Nov. 5, 2019, 20210133644.
U.S. Appl. No. 16/674,467, filed Nov. 5, 2019, 20210133490.
U.S. Appl. No. 16/674,468, filed Nov. 5, 2019, 20210133751.
U.S. Appl. No. 16/674,472, filed Nov. 5, 2019, 20210133772.
U.S. Appl. No. 16/674,474, filed Nov. 5, 2019, 20210133752.
Aggarwal, Yu. "A Condensation Approach to Privacy Preserving Data Mining." Lecture Notices in Computer Science. Mar. 2004.

* cited by examiner

| Location ID | Date | Vendor Name | Product Type | Item Amount | Customer First Name | Customer Last Name | 2nd Party First Name | 2nd Party Last Name | 2nd Party C |
|---|---|---|---|---|---|---|---|---|---|
| 800 | 1/1/2014 | UnionGram | ACH RECEIVE | 12287.71 | James | Culley | James | Dewitt | BH |
| 19 | 1/9/2014 | UnionGram | CHK CARD POS | 474.98 | James | Culley | Anna | Erickson | SS |
| 282 | 1/31/2014 | UnionGram | POS WITHDRAWAL | 4400 | James | Culley | Jimmy | Madrid | SS |
| 282 | 3/2/2014 | UnionGram | POS DEPOSIT | 3856.66 | James | Culley | Anna | Erickson | SS |
| 479 | 4/24/2014 | UnionGram | OUTGOING WIRE | 4632.78 | James | Culley | Gerdie | Waltrip | SS |
| 3277 | 5/7/2014 | UnionGram | TRANSFER RECV | 4500 | James | Culley | Jimmy | Madrid | SS |
| 3277 | 6/6/2014 | UnionGram | CHK CARD POS | 1713.91 | James | Culley | Geosie | Bryant | SS |
| 1646 | 6/27/2014 | UnionGram | TRANSFER SEND | 8100 | James | Culley | Willie | | |
| 479 | 7/6/2014 | UnionGram | ON US CHK | 1069.94 | James | Culley | Jimmy | Madrid | SS |
| 3503 | 7/19/2014 | UnionGram | CHK CARD POS | 1713.91 | James | Culley | Dorothy | Delacruz | Itr |

*FIG. 9*

SYSTEM AND METHOD FOR UNSUPERVISED ABSTRACTION OF SENSITIVE DATA FOR REALISTIC MODELING

TECHNICAL FIELD

The present invention relates generally to a cognitive system implementing a transaction data simulator, and more particularly to systems and methods for unsupervised abstraction of sensitive data for realistic modeling of transaction data.

BACKGROUND

A financial crime detection system, e.g., IBM® Financial Crimes Alerts Insight with Watson™, can utilize cognitive analytics to help banks to detect money laundering and terrorist financing. The cognitive analytics differentiate "normal" financial activities from "suspicious" activities, and use the differentiation information to build a predictive model for banks. A large set of real financial customer data is required to train the predictive model.

Since the real customer data is very sensitive, only a limited amount of real customer data can be provided by banks. However, in order to best simulate fraudulent situations and detect different types of financial crimes, more simulated customer data, e.g., transaction data for training, which looks realistically, could produce a better predictive model.

SUMMARY

According to some embodiments, the present disclosure describes a computer-implemented method for generating a standard customer profile in a data processing system. The method includes performing steps by a processing device, including receiving customer data from a computing device over a network, the customer data including information on plurality of features for a plurality of customers, performing unsupervised learning on the customer data to produce a plurality of clusters of customers with a plurality of features in common, determining that a cluster represents a standard customer and storing a plurality of standard customer profiles based on the determined standard customers, wherein the standard customer profiles comprise a plurality of data distributions for the plurality of features in common, The method also includes deriving additional standard customer profiles by applying a boundary limiter to the customer data and comparing the boundary limited customer data to the determined standard customers. The method further includes providing the standard customer profiles and the additional standard customer profiles to a cognitive system for generating synthetic transaction data based on the standard customer.

According to other embodiments, the present disclosure describes an abstraction system for generating a standard customer profile in a data processing system. The abstraction system may include a processing device and a memory. The abstraction system may receive customer data from a computing device over a network, the customer data including information on plurality of features for a plurality of customers, perform unsupervised learning on the customer data to produce a plurality of clusters of customers with a plurality of features in common, determine that a cluster represents a standard customer, and store a plurality of standard customer profiles based on the determined standard customers, wherein the standard customer profiles comprise a plurality of data distributions for the plurality of features in common. The abstraction system also derives additional standard customer profiles by applying a boundary limiter to the customer data and compares the boundary limited customer data to the determined standard customers. The abstraction system additionally provides the standard customer profiles and the additional standard customer profiles to a cognitive system for generating synthetic transaction data based on the standard customer.

According to additional embodiments, the present disclosure describes a non-transitory computer readable medium having stored thereon instructions for generating a standard customer profile in a data processing system, which when executed by at least one processing device performs disclosed methods consistent with disclosed embodiments.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 9 depicts a schematic diagram showing a plurality of synthetic transaction data entries, consistent with disclosed embodiments.

DETAILED DESCRIPTION

Figure 1:
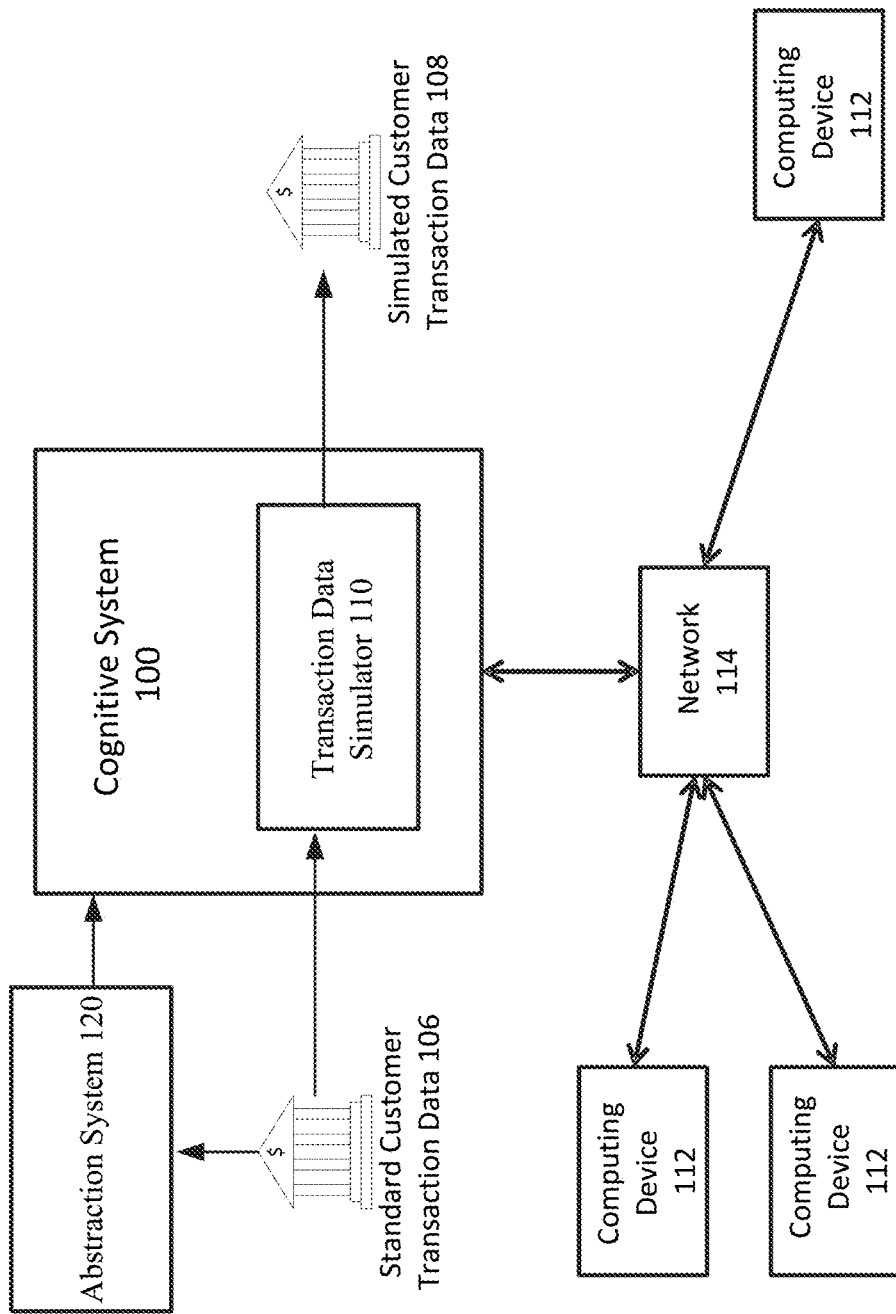
FIG. 1 depicts a block diagram of one illustrative embodiment of a cognitive system implementing a transaction data simulator in a computer network, consistent with disclosed embodiments.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimics human cognition based on experiences
- Answer questions based on natural language and specific evidence In one aspect, the cognitive system can be augmented with a transaction data simulator, to simulate a set of customer transaction data from a financial institution, e.g., a bank. The simulated customer transaction data, even if it is not "actual" customer transaction data from the financial institution, can be used to train the predictive model for identifying financial crimes.

The transaction data simulator combines a multi-layered unsupervised clustering approach with interactive reinforcement learning (IRL) model to create a large set of intelligent agents that have learned to behave like "standard customers."

In an embodiment, the multi-layered unsupervised clustering approach creates a large set of standard customer transaction behaviors (extracted from real customer transaction data provided by a bank), using information including hundreds of attributes of "standard customers" over varying periods of time. Each standard customer transaction behavior can be associated with a group of customers having similar transaction characteristics. An intelligent agent generates an artificial customer profile, and selects one of standard customer transaction behaviors to be combined with the generated artificial customer profile. In this way, the intelligent agent can simulate a "standard customer," and learn to behave like the "standard customer." The intelligent agent is then provided with a period of time (e.g., ten years), during which the intelligent agent can observe an environment, e.g., past behaviors of the represented "standard customer") and learn to perform "fake" customer transactions which are similar to standard customer transaction behavior of the represented "standard customer." Each factor of the standard customer transaction behavior can be statistic data. For example, the transaction amount of the standard customer transaction behavior can be a range of values, e.g., the transaction amount of the standard customer transaction behavior is $20-$3,000. The transaction location of the standard customer transaction behavior can be provided statistically, e.g., 30% of transaction locations are shopping malls, 50% of transaction locations are restaurants, and 20% of transaction locations are gas stations. The transaction type of the standard customer transaction behavior can be provided statistically, e.g., 20% of transaction types are check payment, 40% of transaction types are POS payment, 25% of transaction types are ATM withdrawal, and 15% of transaction types are wire transfer. The transaction medium of the standard customer transaction behavior can be provided statistically, e.g., 15% of transaction mediums are cash, 45% of transaction mediums are credit card, 25% of transaction mediums are checking accounts, and 15% of transaction mediums are PayPal®.

In an embodiment, a large number of artificial customer profiles are generated from a plurality of real customer profile data. The real customer profile data can be provided by one or more banks. Each real customer profile can include an address of a customer; a name of a customer (the customer can be a legal entity or individual); contact information such as a phone number, an email address, etc.; credit information, such as a credit score, a credit report, etc.; income information (e.g., an annual revenue of a legal entity, or a wage of an individual), and the like. The real customer profile data are stored under different categories. For example, commercial customers (i.e., legal entities) can be divided into different categories based on the size, product or service of the commercial customers. An artificial customer profile can be generated by randomly searching all the real customer profile data. For example, an artificial customer profile can be generated by combining randomly selected information including address, first name, second name, phone number, email address, credit score, revenue or wage, etc. Thus, the generated artificial customer profile extracts different pieces of information from real customer profile data, and thus looks like a realistic customer profile. Financial transaction data is further simulated associated with each artificial customer profile.

In an embodiment, to protect privacy of real customers, composite information, such as an address, a name, etc. can be split into a plurality of parts before the random selection. For example, the address "2471 George Wallace Street" can be parsed into 3 parts: [number] "2471," [name] "George Wallace," and [suffix] "Street." These parts can be randomly selected individually to form an artificial customer profile. In a further embodiment, the composite information of an artificial customer profile, such as an address, a name, etc. is compared to the composite information of a real customer profile. If the similarity degree is greater than a predefined threshold value, then the artificial customer profile is unacceptable and needs to be updated until the similarity degree is less than the predefined threshold value.

FIG. 1 depicts a schematic diagram of one illustrative embodiment of a cognitive system 100 implementing a transaction data simulator 110 and an abstraction system 120 in a computer network 114. The cognitive system 100 is implemented on one or more computing devices 112 (comprising one or more processing devices and one or more memories, and potentially any other computing device elements generally known in the art including buses, storage devices, communication interfaces, and the like) connected to the computer network 114. The computer network 114 includes multiple computing devices 112 in communication with each other and with other devices or components via one or more wired and/or wireless data communication links, where each communication link comprises one or more of wires, routers, switches, transmitters, receivers, or the like. Other embodiments of the cognitive system 100 may be used with components, systems, sub-systems, and/or devices other than those that are depicted herein. The computer network 114 includes local network connections and remote connections in various embodiments, such that the cognitive system 100 may operate in environments of any size, including local and global, e.g., the Internet. The cognitive system 100 is configured to implement a transaction data simulator 110 that can simulate standard customer transaction data 106 (i.e., a standard customer transaction behavior). The transaction data simulator 110 can generate a large set of simulated customer transaction data 108 based on the standard customer transaction data 106, so that the simulated customer transaction data 108 looks like real customer transaction data. In an embodiment, the standard customer transaction data 106 is obtained through unsupervised clustering approach. Raw customer data including a large amount of customer transaction data is provided by one or more banks, and a large set of small groups representing different characteristics of bank customers are clustered or grouped from the raw customer data through unsupervised clustering approach. Each small group includes transaction data from customers having similar characteristics. For example, group A represents customers who are single attorneys practicing patent law in New York, while group B represents customers who are married attorneys practicing commercial law in New York.

The abstraction system 120 is implemented in hardware and/or software and is configured to perform unsupervised abstraction of standard customer transaction data 106 to produce one or more standard customers that are abstract representations of real customers, but which do not contain traceable customer information that could expose sensitive information. In an exemplary embodiment, the abstraction system 120 is configured to perform repeated unsupervised learning steps to cluster and sub-cluster real customer data to produce a standard customer that represents a small group of customers.

Figure 2:
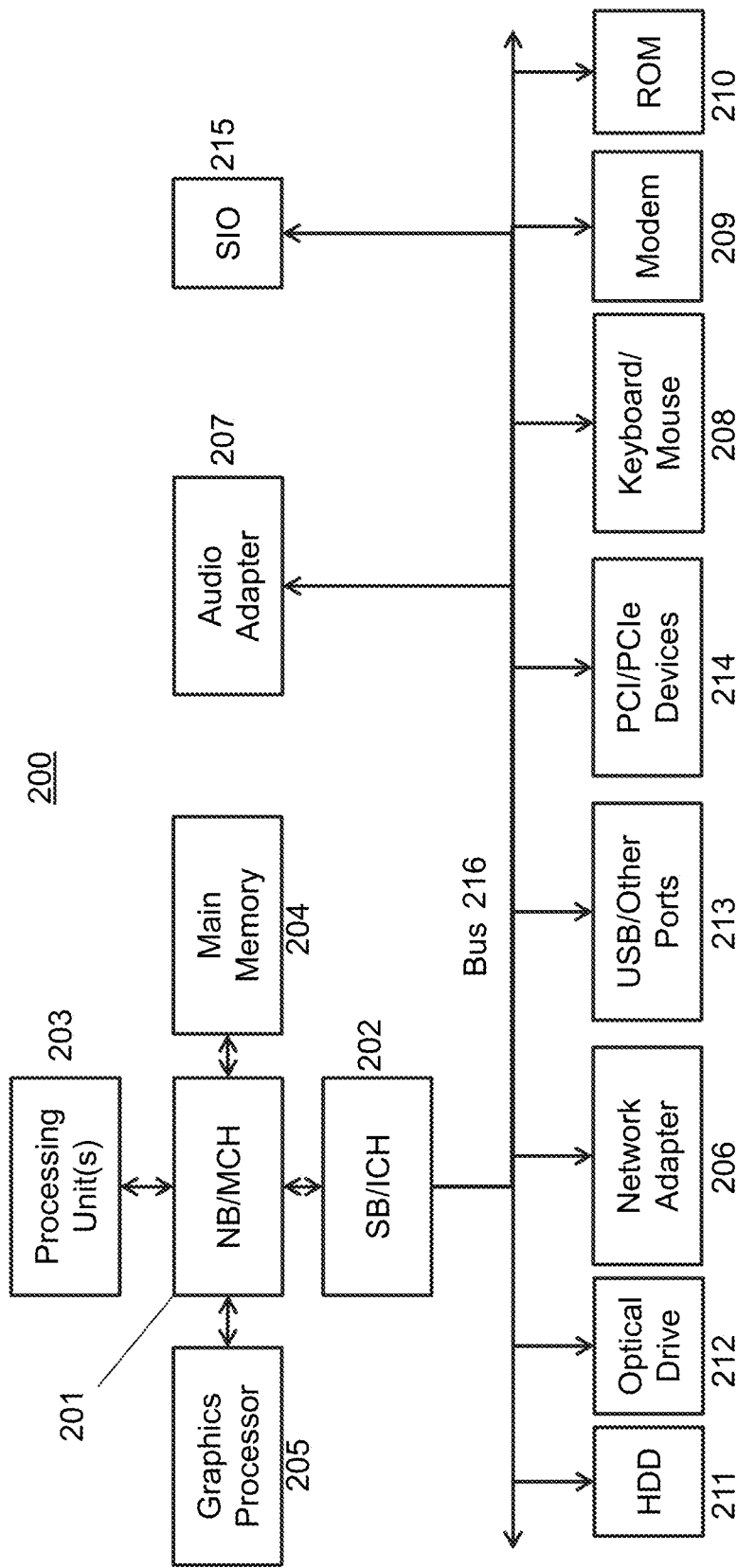
FIG. 2 depicts a block diagram of an example data processing system in which aspect of the illustrative embodiments may be implemented, consistent with disclosed embodiments.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, FIG. 2 represents the transaction data simulator 110, which implements at least some of the aspects of the cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the LINUX® operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the web site navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the abstraction system 120. However, it should be understood that a transaction data simulator 110 may include one or more of the components and configurations of the data processing system 200 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
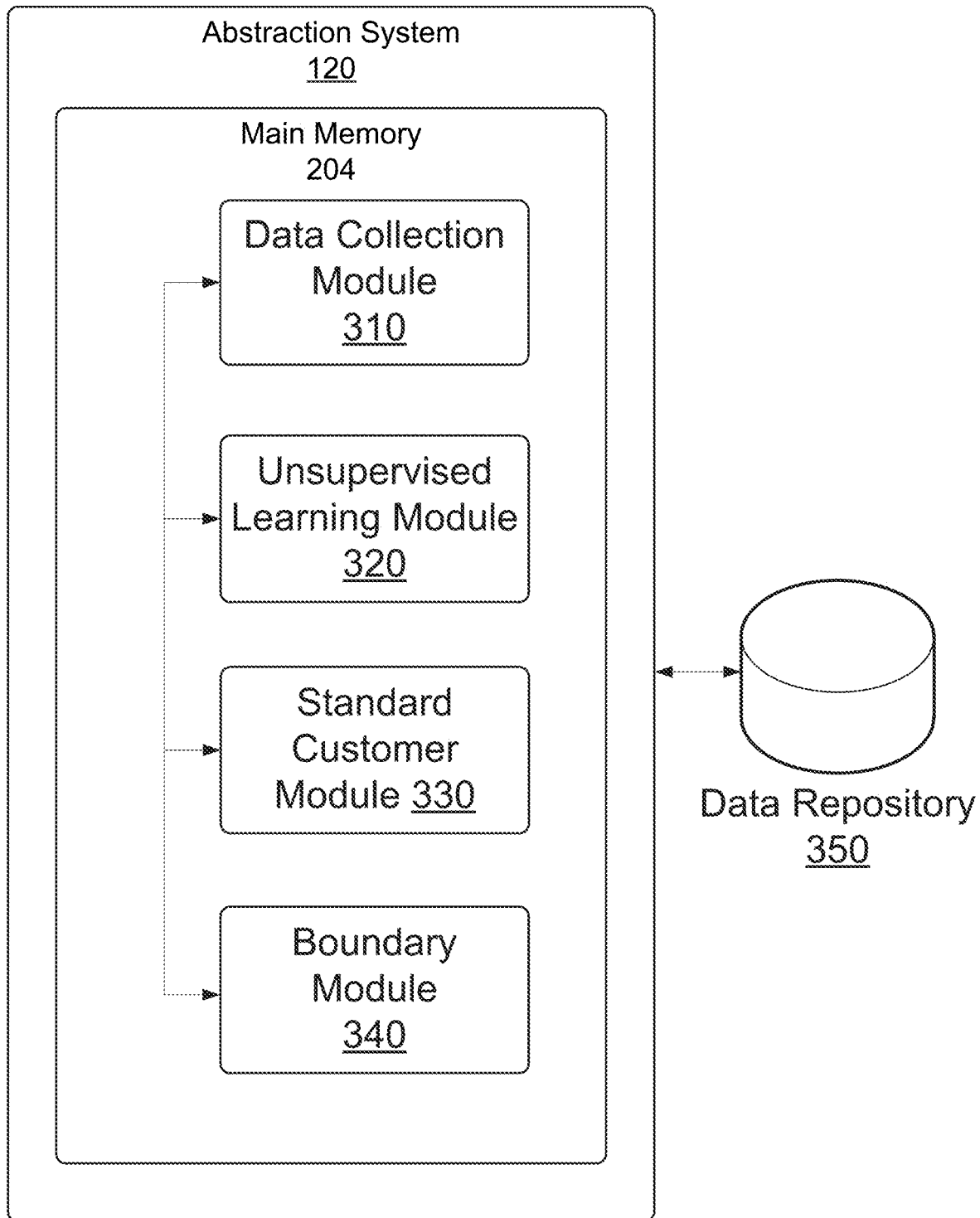
FIG. 3 depicts a schematic diagram of one illustrative embodiment of the abstraction system, consistent with disclosed embodiments.

FIG. 3 is a schematic diagram of one illustrative embodiment of the abstraction system 120. In some embodiments, the abstraction system 120 may include a plurality of modules stored in the main memory 204. The plurality of modules may be implemented in hardware and/or software. The abstraction system 120 may include a data collection module 310, an unsupervised learning module 320, a standard customer module 330, and a boundary module 340. In some embodiments, the abstraction system 120 may further include and/or be connected to one or more data repositories 350.

The data collection module 310 may be configured to receive customer data from a computing device 112. The customer data may be actual customer data. For example, the customer data 106 from a financial institution and include information such as identifying information, transaction information, etc. The customer data 106 may include a variety of features that are separately stored as individual categories of information. For instance, the customer data 106 may include spending data, payment data, time period data, location data, etc. In some embodiments, the data collection module 310 may be configured to collect data from a plurality of computing devices 112, such as from a plurality of financial institutions. In some embodiments, the data collection module 310 may be configured to perform a filtering process to create groups of data for analysis. For example, the data collection module 310 may use a manual or automatic categorization of customers to create a pool of similar customers (e.g., individuals, corporations, retail, service, etc.).

The unsupervised learning module 320 may be configured to perform unsupervised learning on a data set. The unsupervised learning may be, for example, a clustering algorithm configured to group one or more subsets of data based on patterns, trends, and/or other similarities found in the data. The unsupervised learning module 320 may be configured to perform a clustering process without manual input into the groupings (thus "unsupervised" learning). As a result, the clusters may be free from biases of how a user may believe that data should be grouped.

The standard customer module 330 may be configured to extract clusters or groups from the output of the unsupervised learning module in order to generate and store a standard customer profile that is based on the input data from the data collection module. The standard customer module 330 may be configured to perform a general sanity check of a cluster (e.g., sample size, statistical significance, etc.) to determine when a cluster or sub-cluster can be considered a standard customer.

The boundary module 340 may be configured to further divide collected customer data according to one or more boundaries. For instance, the boundary module 340 may be a statistic and/or time slicing module configured to further filter data according to one or more parameters such that an individual customer and/or standard customer can be analyzed from different viewpoints. For instance, the boundary module 340 may create subcategories of data based on two or more features (e.g., transaction information and time information). For instance, customer data collected by the data collection module 310 may provide transaction information for a customer over a year. The boundary module 340 may place time period boundaries on the data over the year to identify additional features that can be considered data points. For instance, the boundary module 340 may create categories for "holiday spending," "vacation spending," "lunchtime spending," "savings periods," etc. The boundary module 340 may thus be used to further subdivide and categorize customer data. The boundary module 340 may apply these principles to standard customers in some embodiments. For example, the boundary module 340 may derive additional standard customer behaviors from an established customer behavior by groping data at certain time periods or based on other statistical boundaries.

Figure 4:
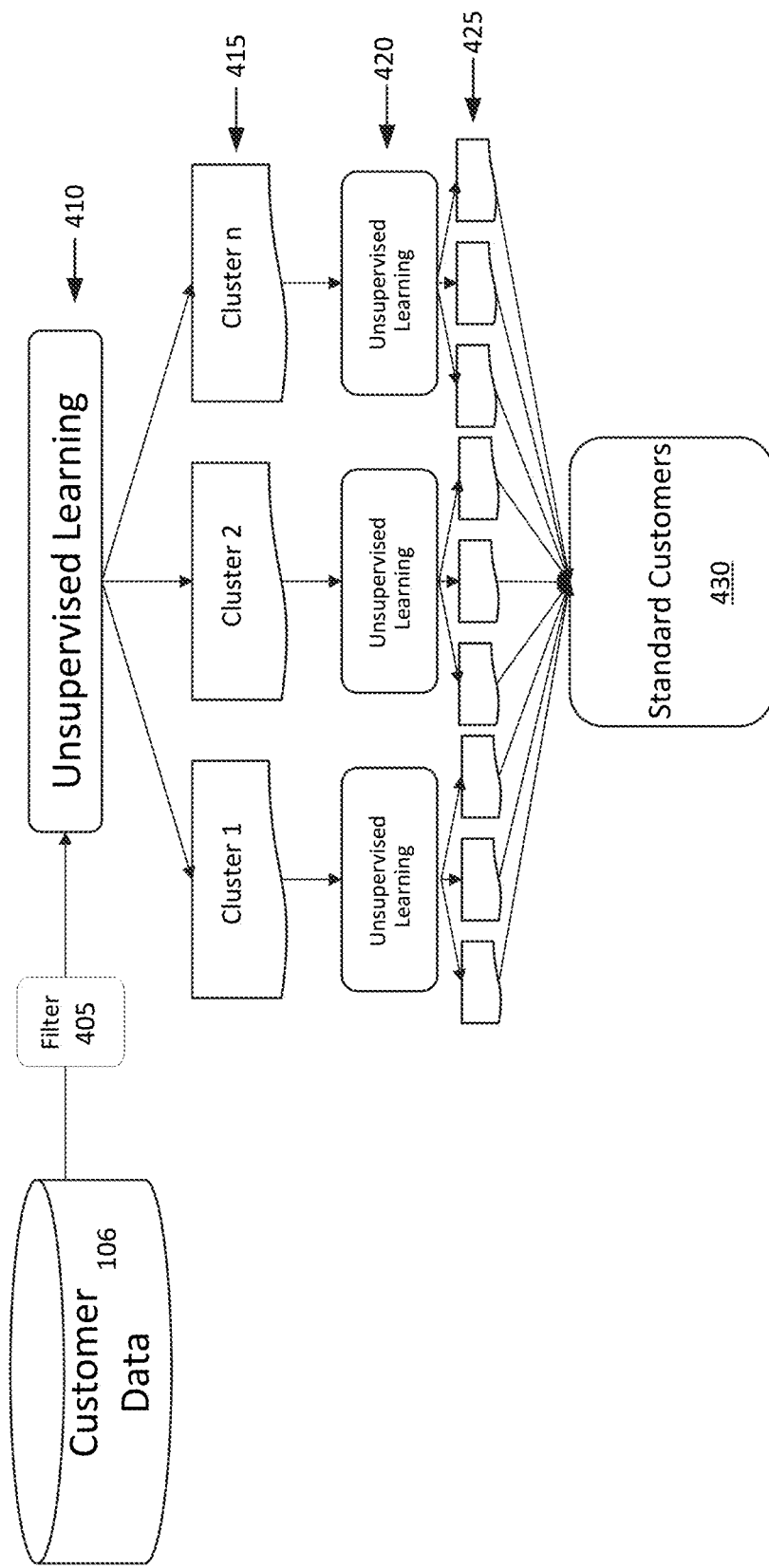
FIG. 4 depicts an exemplary flow from customer data to standard customers, consistent with disclosed embodiments.

FIG. 4 is a diagram of a process flow for using unsupervised learning on customer data 106 to produce one or more standard customer profiles using data abstraction. As a result of the data abstraction, the customer data 106 is abstracted/aggregated to the point that it can be saved and stored locally, without privacy issues. In some embodiments, the data collection module 310 may receive customer data 106 from one or more computing devices 112. The data collection module 310 may perform initial filtering 405 of the data. For instance, the data collection module 310 may perform an RFM (recency, frequency, monetary value) analysis to subgroup data from the customer data 106. The unsupervised learning module 320 may perform a clustering process 410 to create one or more data clusters 415. The one or more data clusters 415 may be groupings of customers based on the unsupervised learning algorithm applied as the clustering process 410. The clusters 415 may be based on a similarity of one or more features in the customer data. For instance "Cluster 1" of the clusters 415 may be all customers in a particular geographic area while "Cluster 2" of the clusters 415 may be all customers over a particular age, that spend a certain amount per year, that deposit less than a certain amount per year, etc. The unsupervised learning 410 may produce any number of clusters 415 and a customer may be in more than one of the clusters.

The unsupervised learning module 320 may perform additional clustering processes 420 to create one or more sub-clusters 425. This unsupervised learning module 320 may generate sub-clusters 425 through further grouping of customers based on an additional similarity in the data. For instance, for customers in an initial cluster 415 based on location, a sub-cluster may be based on age, job, spending, transaction details, etc. The unsupervised learning 420 to produce sub-clusters 425 may be repeated any number of times until the standard customer module 330 identifies a cluster of sub-cluster that is considered a standard customer 430. For instance, the standard customer module 330 may select clusters that satisfy certain criteria, such as number of customers and/or similar features in a group. The customer module 330 may store these as standard customers 430 as profiles for use as "abstract" customers that can be used to reproduce realistic customer data. For instance, the standard customers 430 may be provided to the cognitive system 100 for use with the transaction data simulator 110.

Figure 5:
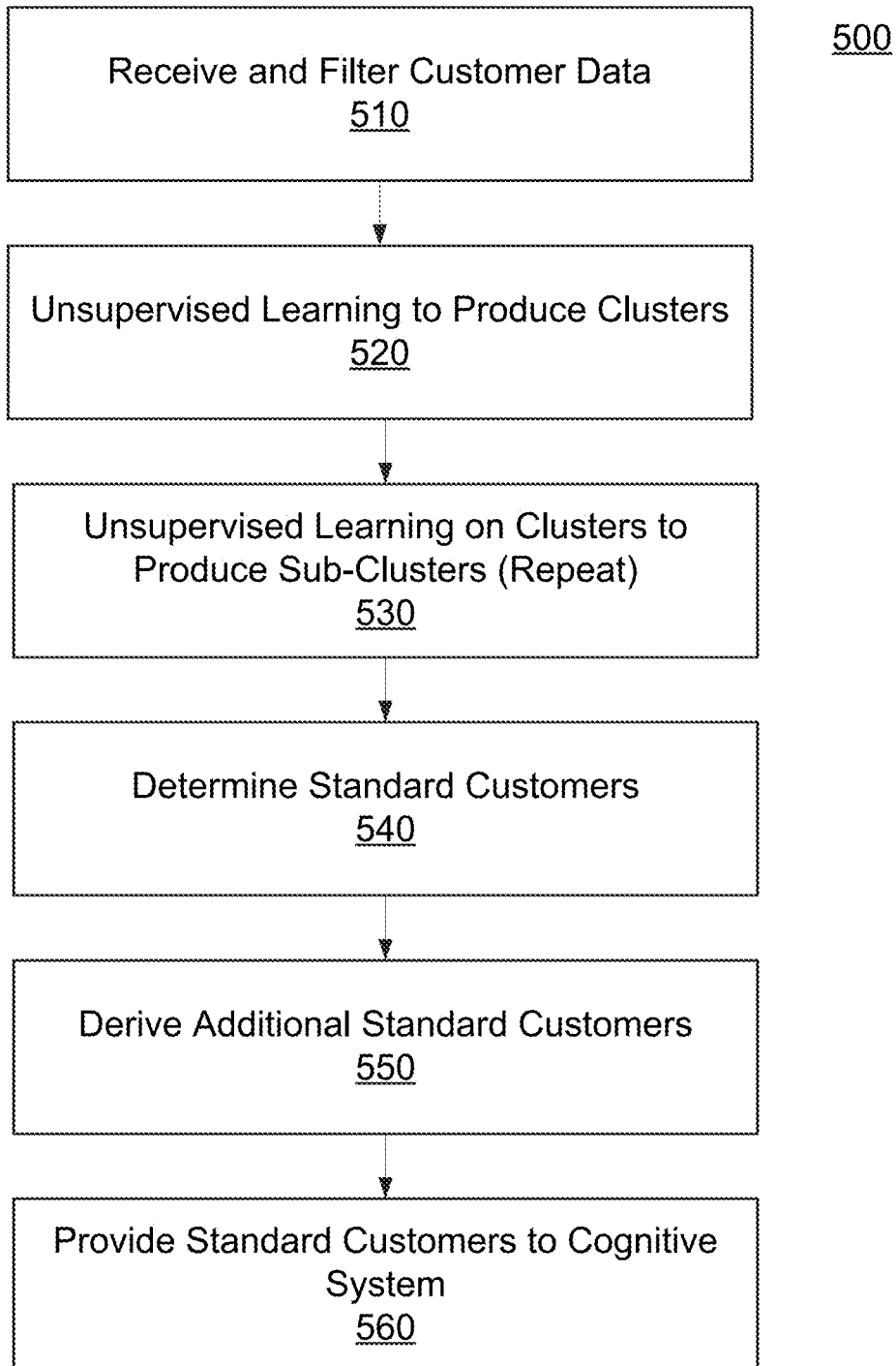
FIG. 5 depicts a flow chart of one illustrative embodiment of a method of abstracting data to generate standard customers, consistent with disclosed embodiments.

FIG. 5 is an exemplary process 500 for converting customer data into abstract standard customers for use in generating synthetic transaction data that is realistic but cannot be traced back to the actual data. In step 510, the data collection module 310 receives and filters customer data. In step 520, the unsupervised learning module 320 applies an algorithm to data to produce clusters of customers based on their similarity in at least one feature. In step 530, the unsupervised learning module performs unsupervised learning on clusters to produce sub-clusters of customers and customer features. The clustering process may be repeated as necessary to produce smaller and more specific groups of customers. In at least some embodiments, each unsupervised learning step adds a data feature to a grouping of customers.

In step 540, the standard customer module 330 determines standard customers based on the clusters and sub-clusters of data through unsupervised learning. The standard customer module 330 may use a rules database to determine when a cluster is considered a standard customer. For instance, the standard customer module 330 may compare a number of data features and a number of customers in a grouping to threshold values to determine whether the group has sufficient and/or narrow enough data to be considered a standard customer.

In step 550, the boundary module 340 may further derive additional standard customers. For example, in some embodiments, the boundary module 340 may add customers to standard customer profiles based on a portion of their data fitting into a customer profile. For instance, the boundary module 340 may perform a bounding operation on customer data to identify customers that fit into standard customer profiles when certain boundaries are applied. For instance, the boundary module 340 may select a cluster or a standard customer profile and perform additional analysis to view the evolution of behavior of a customer when the element of time is considered. In other examples, the boundary module 340 may apply a statistical boundary to derive additional standard customers.

In step 560, the abstraction system 120 may provide the standard customers to the cognitive system 100. The cognitive system may use the standard customers as an input to create new, synthetic transaction data 108 that fits in the standard customer behavior, but is not traceable back to the original, actual customer data. As a result, real customer data 106 is used to create artificial customer data 108 that can be relied upon as being realistic but which does not expose the actual sensitive customer data.

Figure 6:
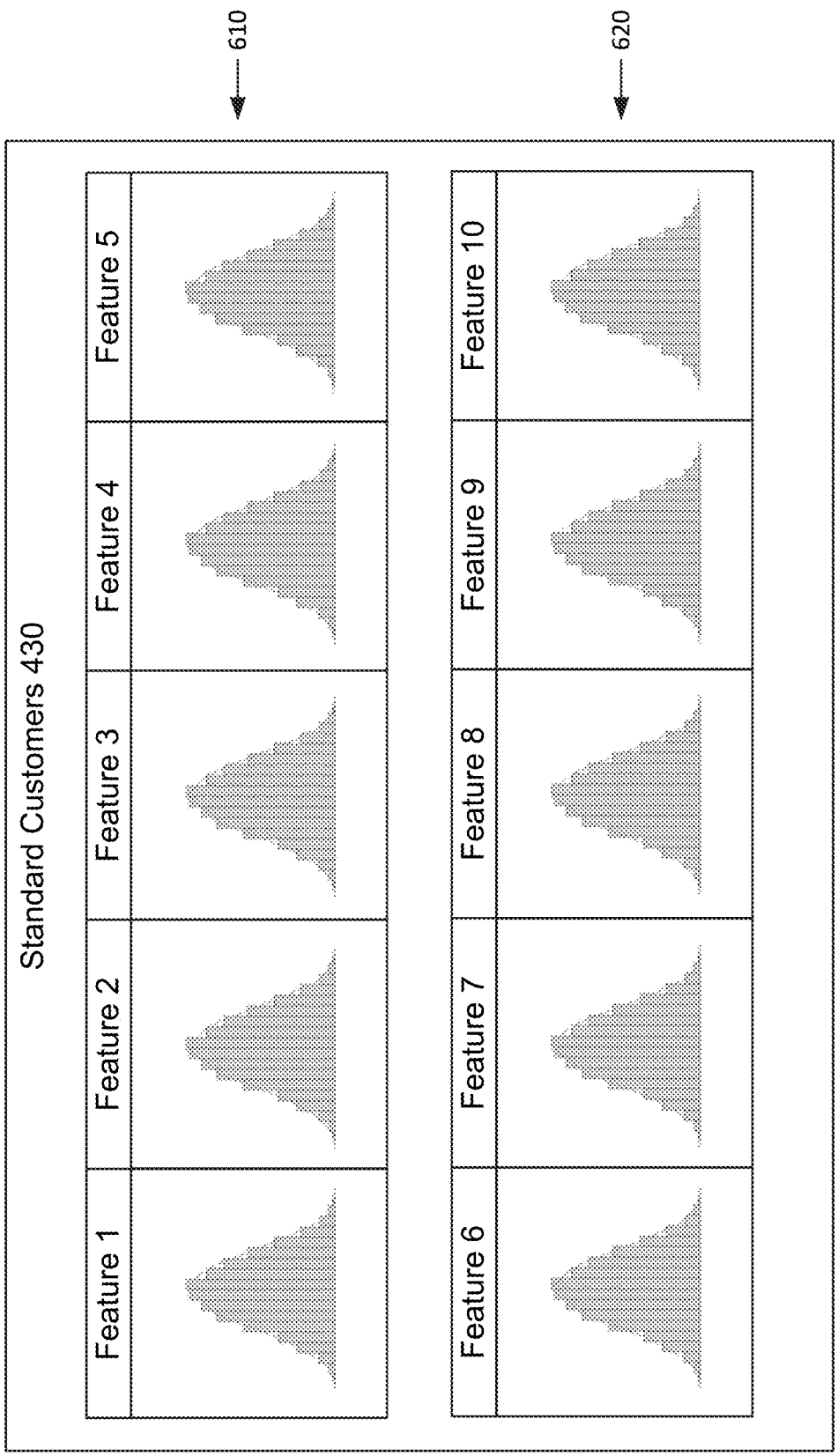
FIG. 6 depicts a schematic diagram of example standard customers produced by the abstraction system, consistent with disclosed embodiments.

FIG. 6 is a representation of standard customers 610, 620 that may be generated through one or more disclosed processes based on customer data 106. In an exemplary embodiment, the standard customers 610, 620 include a plurality of features that describe the customers that are present in the grouping that makes up the standard customer 610, 620. For instance, feature 1 may include a customer age, feature 2 may include customer income, feature 3 may include customer spending, etc. At least some of the features that make up the standard customers 610, 620 may be represented as a distribution of data. For instance, the distribution may be a distribution of data with data points for each customer in the standard customer profile. The distribution is thus a representation of the actual customer data, but it is a generic, statistical representation that is abstracted such that the actual data is not exposed.

Figure 7:
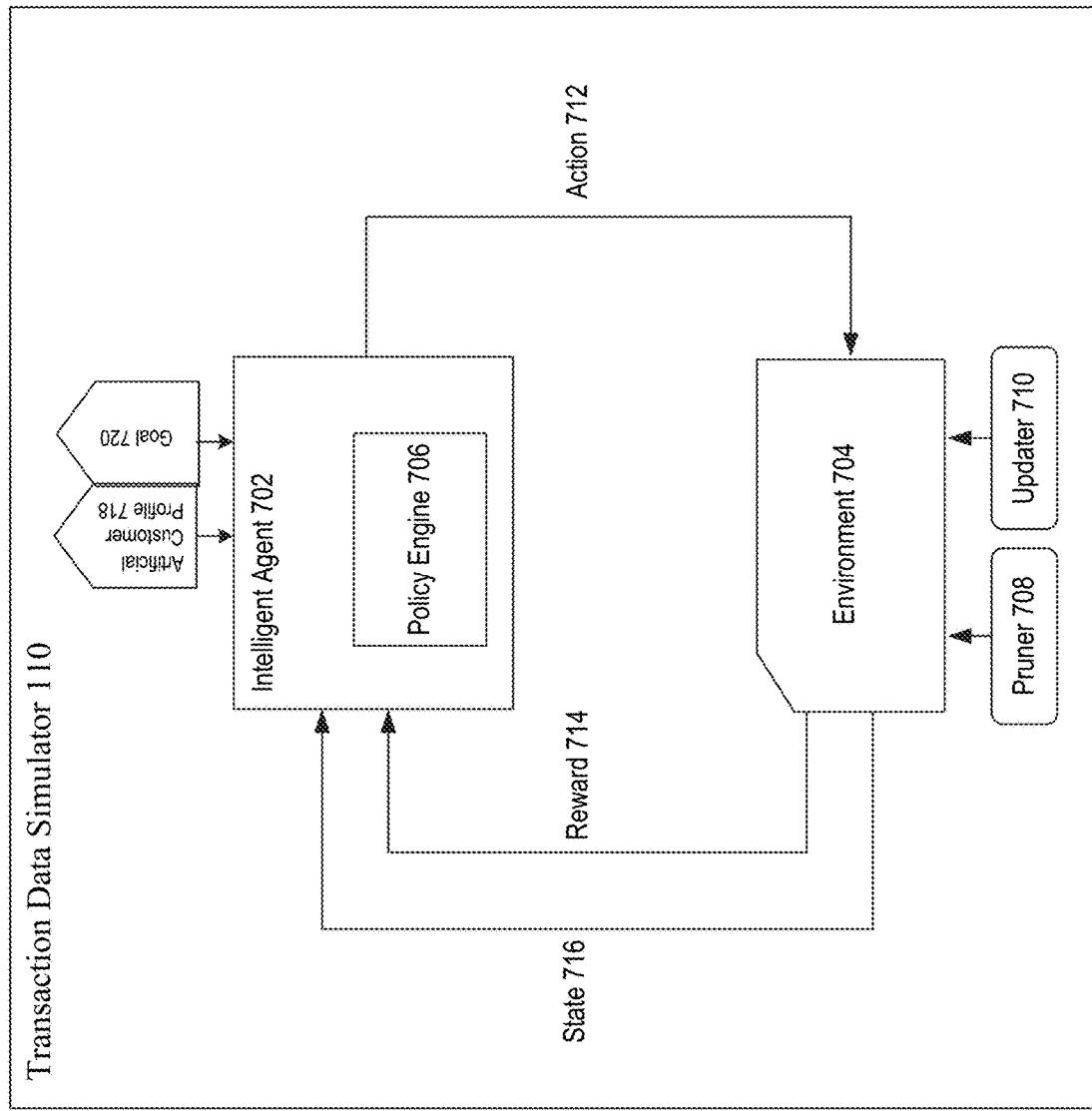
FIG. 7 depicts a schematic diagram of one illustrative embodiment of the transaction data simulator, consistent with disclosed embodiments.

FIG. 7 depicts a schematic diagram of one illustrative embodiment of the transaction data simulator 110. The transaction data simulator 110 utilizes reinforcement learning techniques to simulate financial transaction data. The transaction data simulator 110 includes intelligent agent 702, and environment 704. The intelligent agent 702 randomly selects a standard transaction behavior 720 (i.e. goal 720) representing a group of "customers" having similar transaction characteristics, and associates the standard transaction behavior with a randomly selected artificial customer profile 718. The intelligent agent 702 takes an action 712 in each iteration. In this embodiment, the action 712 taken in each iteration includes conducting a plurality of transactions in a single day. Each transaction has the information including transaction type (e.g., Automated Clearing House (ACH) transfer, check payment, Wire transfer, Automated Teller Machine (ATM) withdrawal, Point of Sale (POS) payment, etc.); transaction amount; transaction time; transaction location; transaction medium (e.g., cash, credit card, debit card, PayPal®, checking account, etc.); the second party who is related to the transaction (e.g., a person who receives the wire transferred payment), and the like. The environment 704 takes the action 712 as input, and returns reward 714 (or feedback) and state 716 from environment 704 as the output. The reward 714 is the feedback by which the success or failure of the action 712 is measured. In this embodiment, the environment 704 compares the action 712 with goal 720 (e.g., standard transaction behavior). If the action 712 deviates from the goal 720 beyond a predefined threshold, then the intelligent agent 702 is penalized, while if the action 712 deviates from the goal 720 within a predefined threshold (i.e., the action 712 is similar to the goal 720), the intelligent agent 702 is rewarded. The action 712 is effectively evaluated, so that the intelligent agent 702 can improve the next action 712 based on the reward 714. In this embodiment, the environment 704 is a set of all old actions taken by the intelligent agent 702, i.e., the environment 704 is a set of all old simulated transactions. The intelligent agent 702 observes the environment 704, and gets information about the old transactions, e.g., the number of transactions that have been made within a day, a week, a month, or a year; each transaction amount, account balance, each transaction type, and the like. The policy engine 706 can adjust the policy based on the observations, so that the intelligent agent 702 can take a better action 712 in the next iteration.

Figure 8:
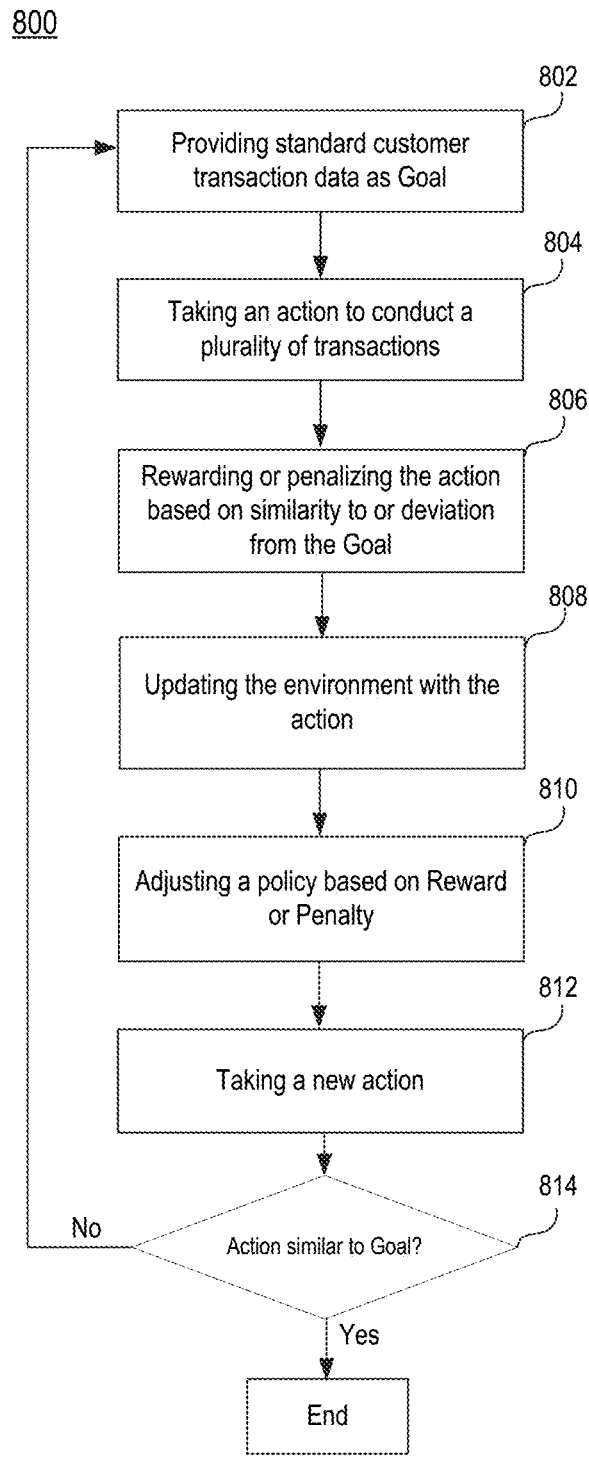
FIG. 8 depicts a flow chart of one illustrative embodiment of a method of simulating transaction data, consistent with disclosed embodiments.

The intelligent agent 702 further includes policy engine 706, configured to adjust a policy based on the state 716 and the reward 714. The policy is a strategy that the intelligent agent 702 employs to determine the next action 712 based on the state 716 and the reward 714. The policy is adjusted, aiming to get a higher reward 714 for the next action 712 taken by the intelligent agent 702. The policy includes a set of different policy probabilities or decision-making probabilities which can be used to decide whether a transaction is going to be performed in a particular day or not, the number of transactions per day, transaction amount, transaction type, transaction party, etc. In reinforcement learning model, outcome of events are random, and a random number generator (RNG) is a system that generates random numbers from a true source of randomness. In an example, the maximum number of transactions per day is 100, and the maximum transaction amount is $15 million. In the first iteration, a random transaction with transaction amount of $15 million to Zimbabwe is made by the intelligent agent 702. This action 712 deviates far from the goal 720 (e.g., transaction made by married attorneys practicing commercial law in Maine), and thus this action 712 is penalized (i.e., the reward 714 is negative). The policy engine 706 is trained to adjust the policy, so that a different transaction which is closer to the goal 720 can be made. With more iterations, transactions which are similar to the goal 720 can be simulated by the "smarter" policy engine 706. As shown in FIG. 8, a plurality of transactions from the customer "James Culley" are simulated, and the simulated transaction data is similar to the goal 720.

As shown in FIG. 2, in an embodiment, one feedback loop (i.e., one iteration) corresponds to one "day" of actions (i.e., one "day" of simulated transactions). During a period of time, e.g., ten years, the intelligent agent 702 learns how to take an action 712 to get a reward 714 as high as possible. The number of iterations corresponds to the duration of time. For example, ten years correspond to 10×365=3650 iterations. Reinforcement learning model judges the actions 712 by the results that the actions 712 produce. It is goal 720 oriented, and its aim is to learn sequences of actions 712 that will lead the intelligent agent 702 to achieve its goal 720, or maximize its objective function.

In an embodiment, the transaction data simulator 110 further includes updater 710. A new action 712 is performed in each iteration. The updater 710 updates the environment 704 with the action 712 taken by the intelligent agent 702 after each iteration. The action 712 taken in each iteration is added into the environment 704 by the updater 710. In an embodiment, the transaction data simulator 110 further includes pruner 708, configured to prune the environment 704. In an embodiment, the pruner 708 can remove one or more undesired actions. For example, actions 712 which are taken in the first ten iterations are removed, because these ten iterations deviate far from the goal 720, and the degree of similarity is below a predefined threshold. In another embodiment, a full re-initialization of the transaction data simulator 110 can be performed to remove all the accumulated actions in the environment 704, so that the intelligent agent 702 can start over again.

FIG. 8 illustrates a flow chart of one illustrative embodiment showing a method 800 of simulating transaction data. At step 802, standard customer transaction behavior data is provided as goal 720. The standard customer transaction behavior represents a group of customers having similar transaction characteristics. The standard customer transaction behavior is obtained through unsupervised clustering approach.

At step 804, an action 712 is taken to conduct a plurality of transactions in an iteration representing e.g., a single day (e.g., 100 transactions per day). Each transaction has the information including transaction type, transaction amount, transaction time, transaction location, transaction medium, the second party who is associated with the transaction, and the like.

At step 806, the environment 704 compares the goal 720 with the action 712 taken in this iteration, rewards or penalizes the action 712 based on similarity to or deviation from the goal 720. The threshold or rule to decide whether the action 712 is similar to the goal 720 or not, is predefined, and can be adjusted based on how similar to the goal 720 the user prefers.

At step 808, the environment 704 is updated to include the action 712 in the present iteration. The environment 704 includes a set of all old actions.

At step 810, the policy engine 706 adjusts a policy for determining the next action 712 based on the reward 714 (i.e., reward or penalty). The policy is made based on a variety of factors, e.g., probability of occurrence of a transaction, the number of transactions per day, transaction amount, transaction type, transaction party, transaction frequency of each transaction type, an upper bound and a lower bound for each transaction, transaction medium, and the like. The policy can adjust weights of these factors based on the reward 714 in each iteration.

At step 812, in a new iteration, the intelligent agent 702 takes a new action 712. The steps 804 to 812 are repeated until the action 712 is similar enough to the goal 720 (step 814). For example, the transaction amount specified in the goal 720 is $20-$3,000. If the transaction amount of each transaction in the action 712 falls within the range of $20-$3,000, then the action 712 is similar enough to the goal 720.

Since the standard customer transaction data 106 may include abnormal data, e.g., a fraudulent transaction, the simulated customer transaction data 108 may also include abnormal data, because the simulated customer transaction data 108 is similar to the standard customer transaction data 106. In reinforcement learning model, the intelligent agent 702 explores the environment 704 randomly or stochastically, learns a policy from its experiences, and updates the policy as it explores to improve the behavior (i.e., transaction) of the intelligent agent 702. In an embodiment, a behavioral pattern (e.g., spending "splurges" until running out of savings, or experiencing "buyer's remorse" on one big purchase, etc.), as opposed to random actions, may emerge during RNG based exploration. An abnormal behavioral pattern may indicate a fraudulent transaction. For example, a simulated customer James Culley may generally make transactions having a transaction amount below $1,000. Suddenly, there is a transaction having a transaction amount of $5,000, and this suspicious transaction may be a fraudulent transaction (e.g., the credit card of James Culley is stolen, or the checking account of James Culley is hacked).

There is a behavioral pattern that naturally emerges during exploration. For example, as shown in FIG. 9, the simulated customer James Culley received an amount of $12,387.71 in a checking account on Jan. 1, 2014. James Culley spent $474.98 on Jan. 9, 2014, $4,400 on Jan. 31, 2014 and $3,856.55 on Mar. 2, 2014 through a debit card associated with the checking account. In the next Month, James Culley received an amount of $12,387.71 in the checking account on Feb. 1, 2014. James Culley spent $4,500 on Feb. 2, 2014, and $1,713.91 on February 3 through the debit card associated with the checking account, and transferred $8,100 out of the checking account on Jun. 27, 2014. In this example, this simulated customer James Culley has a tendency of save-and-spend, and occasionally has a big purchase. The behavioral pattern makes this simulated customer James Culley behave more realistically (i.e., look more like a real customer, rather than a robot). A plurality of parameters, such as "behavioral consistency" (the degree of behavioral consistency in a period of time), "consistency volatility" (frequency of behavior change), "behavior abnormality" (deviation from regular transaction behaviors), etc. are generated by the policy engine 706, and used to show a different personality of each simulated customer.

The transaction data simulator 110 uses abstracted or aggregated real customer data to simulate customer data that is representative of real customers. The transaction data simulator 110 can provide a large set of simulated customer data (i.e., simulated transaction data in combination with an artificial customer profile) that can be used to train a predictive model for detecting abnormal customer behaviors. Further, the simulated customer data is generated based on abstracted data of the real raw customer data, rather than the real raw customer data itself, and thus it is impossible to derive actual transaction actions of any real customer. Additionally, the transaction data simulator 110 allows generation of a behavioral pattern for each simulated customer during iterations.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for generating a standard customer profile in a data processing system comprising a processing device and a memory comprising instructions which are executed by the processing device, the method comprising:
    receiving customer data from a computing device over a network, the customer data including information on plurality of features for a plurality of customers;
    performing, by the processing device, unsupervised learning on the customer data to produce a plurality of clusters of customers with a plurality of features in common;
    determining, by the processing device, that a cluster represents a standard customer and storing a plurality of standard customer profiles based on the determined standard customers, wherein the standard customer profiles comprise a plurality of data distributions for the plurality of features in common;
    deriving additional standard customer profiles by applying a boundary limiter to the customer data and comparing the boundary limited customer data to the determined standard customers; and
    providing the standard customer profiles and the additional standard customer profiles to a cognitive system for generating synthetic transaction data based on the standard customer through a reinforcement learning model by:
        providing one of the standard customer profiles and the additional standard customer profiles to a cognitive system as a goal,
        performing a plurality of iterations to generate synthetic transaction data, wherein the plurality of iterations is performed until a degree of similarity of the synthetic transaction data relative to the one of the standard customer profiles and the additional standard customer profiles to a cognitive system is higher than a first predefined threshold, in each iteration:
            conducting an action including a plurality of synthetic transactions,
            comparing the action with the goal,
            providing a feedback associated with the action based on a degree of similarity relative to the goal, and
            adjusting a policy based on the feedback, wherein the adjustment is configured to gain a superior feedback for a next action.

2. The method of claim 1, wherein the information for the plurality of customers comprises identifying information and transaction information.

3. The method of claim 1, further comprising filtering the customer data prior to performing unsupervised learning.

4. The method of claim 3, wherein the filtering comprises an RFM analysis to group customers.

5. The method of claim 1, wherein the performing unsupervised learning comprises clustering customers based on a feature in common and repeating unsupervised learning to form sub-clusters of customers based on the plurality of features in common.

6. The method of claim 1, wherein determining that a sub-cluster represents a standard customer comprises applying one or more rules.

7. The method of claim 6, wherein the one or more rules comprise a size determination indicating a maximum number of customers in a sub-cluster that is determined to be a standard customer.

8. An abstraction system comprising a processing device and a memory comprising instructions which are executed by the processing device for generating a standard customer profile in a data processing system configured to:
    receive customer data from a computing device over a network, the customer data including information on plurality of features for a plurality of customers;
    perform, by the processing device, unsupervised learning on the customer data to produce a plurality of clusters of customers with a plurality of features in common;
    determine, by the processing device, that a cluster represents a standard customer and storing a plurality of standard customer profiles based on the determined standard customers, wherein the standard customer profiles comprise a plurality of data distributions for the plurality of features in common;
    derive additional standard customer profiles by applying a boundary limiter to the customer data and comparing the boundary limited customer data to the determined standard customers; and
    provide the standard customer profiles and the additional standard customer profiles to a cognitive system for generating synthetic transaction data based on the standard customer through a reinforcement learning model by:
        providing one of the standard customer profiles and the additional standard customer profiles to a cognitive system as a goal,
        performing a plurality of iterations to generate synthetic transaction data, wherein the plurality of iterations is performed until a degree of similarity of the synthetic transaction data relative to the one of the standard customer profiles and the additional standard customer profiles to a cognitive system is higher than a first predefined threshold, in each iteration:
            conducting an action including a plurality of synthetic transactions,
            comparing the action with the goal,
            providing a feedback associated with the action based on a degree of similarity relative to the goal, and adjusting a policy based on the feedback, wherein the adjustment is configured to gain a superior feedback for a next action.

9. The abstraction system of claim 8, wherein the information for the plurality of customers comprises identifying information and transaction information.

10. The abstraction system of claim 8, wherein the data processing system is further configured to filter the customer data prior to performing unsupervised learning.

11. The abstraction system of claim 10, wherein the filtering comprises an RFM analysis to group customers.

12. The abstraction system of claim 8, wherein the performing unsupervised learning comprises clustering customers based on a feature in common and repeating unsupervised learning to form sub-clusters of customers based on the plurality of features in common.

13. The abstraction system of claim 8, wherein determining that a sub-cluster represents a standard customer comprises applying one or more rules.

14. The abstraction system of claim 13, wherein the one or more rules comprise a size determination indicating a maximum number of customers in a sub-cluster that is determined to be a standard customer.

15. A computer program product comprising software that when executed by a processor performs a method comprising:
receiving customer data from a computing device over a network, the customer data including information on plurality of features for a plurality of customers;
performing, by the processor, unsupervised learning on the customer data to produce a plurality of clusters of customers with a plurality of features in common;
determining, by the processor, that a cluster represents a standard customer and storing a plurality of standard customer profiles based on the determined standard customers, wherein the standard customer profiles comprise a plurality of data distributions for the plurality of features in common;
deriving additional standard customer profiles by applying a boundary limiter to the customer data and comparing the boundary limited customer data to the determined standard customers; and
providing the standard customer profiles and the additional standard customer profiles to a cognitive system for generating synthetic transaction data based on the standard customer through a reinforcement learning model by:
providing one of the standard customer profiles and the additional standard customer profiles to a cognitive system as a goal,
performing a plurality of iterations to generate synthetic transaction data, wherein the plurality of iterations is performed until a degree of similarity of the synthetic transaction data relative to the one of the standard customer profiles and the additional standard customer profiles to a cognitive system is higher than a first predefined threshold, in each iteration:
conducting an action including a plurality of synthetic transactions,
comparing the action with the goal,
providing a feedback associated with the action based on a degree of similarity relative to the goal, and
adjusting a policy based on the feedback, wherein the adjustment is configured to gain a superior feedback for a next action.

16. The method of claim 15, wherein the information for the plurality of customers comprises identifying information and transaction information.

17. The method of claim 15, further comprising filtering the customer data prior to performing unsupervised learning.

18. The method of claim 17, wherein the filtering comprises an RFM analysis to group customers.

19. The method of claim 15, wherein the performing unsupervised learning comprises clustering customers based on a feature in common and repeating unsupervised learning to form sub-clusters of customers based on the plurality of features in common.

20. The method of claim 15, wherein determining that a sub-cluster represents a standard customer comprises applying one or more rules.

21. The method of claim 20, wherein the one or more rules comprise a size determination indicating a maximum number of customers in a sub-cluster that is determined to be a standard customer.

* * * * *